Dec. 2, 1930. E. W. W. KEENE 1,783,937
FILTERING APPARATUS
Filed March 1, 1930 4 Sheets-Sheet 2

INVENTOR
Edward Walter Wolfe Keene,
BY
ATTORNEYS.

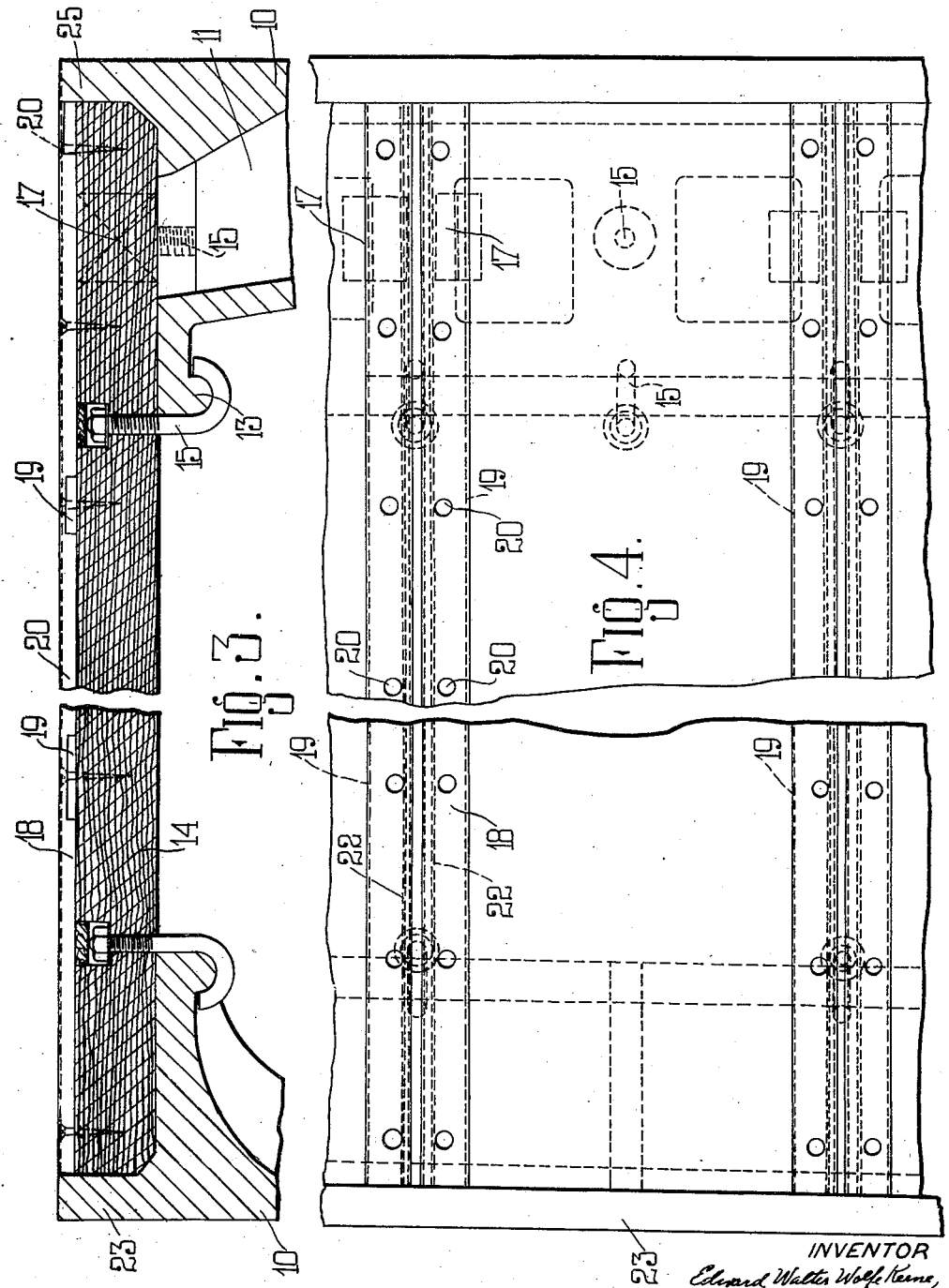

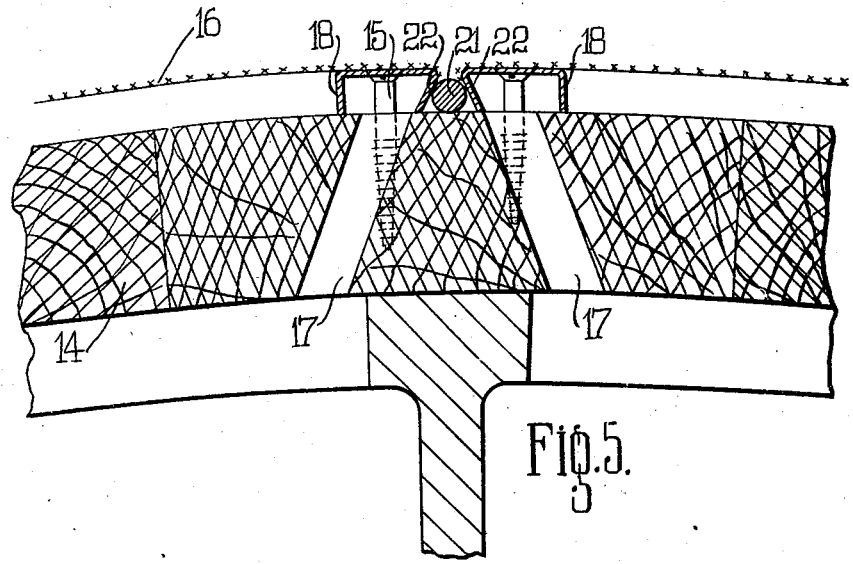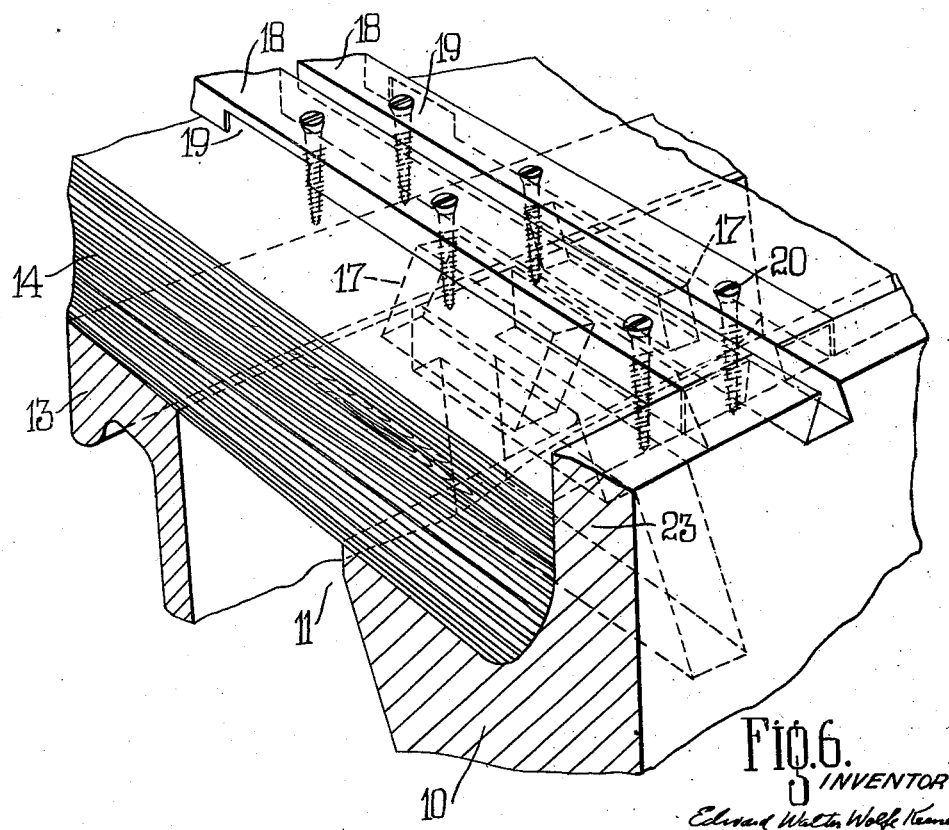

Patented Dec. 2, 1930

1,783,937

UNITED STATES PATENT OFFICE

EDWARD WALTER WOLFE KEENE, OF KINGSTON-UPON-HULL, ENGLAND

FILTERING APPARATUS

Application filed March 1, 1930, Serial No. 432,424, and in Great Britain November 8, 1928.

The present invention relates to filtering apparatus and more particularly to rotary filters in which a filtering medium, such as, for example, a filtering cloth, is carried upon a rotary member such as a drum.

In rotary filters of the type set forth it is well known to provide a number of filter compartments which are subjected to a vacuum or a pressure or again are subjected intermittently to both vacuum and pressure during the filtering process. In referring herein to known constructions or to the present invention, for the sake of clearness, mention will only be made to vacuum, but it will be appreciated that where vacuum is referred to, the construction is equally well applicable to the use of pressure or again to the intermittent use of vacuum and pressure.

The two most well known forms of construction at present used either involve the use of a series of pipes as the means for subjecting the multiple filter compartments to a vacuum, or alternatively the members supporting the filtering medium, such as a filter cloth, are constructed of cellular shape forming separate compartments.

In the case of the former type, and particularly where a comparatively large number of pipes are required for the purpose of promoting maximum efficiency, a congestion is caused, whilst other disadvantages exist in that an uneven directional distribution of vacuum is created, a great number of joints have to be made for the pipe ends, and excessive labour is involved in setting up the plant and whenever replacement of pipes is required.

In the latter case it is usual, in order to completely isolate the cellular shaped members forming the filter compartments from each other, to make these by casting the whole en bloc i. e. integral with the drum end plates as otherwise difficulty is experienced in making the compartments airtight. This involves the disadvantages that an excessive amount of material has to be used with the consequential result that the plant is heavy, whilst a surplus duty is imposed upon the accessory plant required for providing the desired vacuum owing to the large and unnecessary drainage area or volume exposed for either displacement or replacement.

The object of the present invention is to overcome the disadvantages referred to; that is to say to provide a rotary filter free from both the difficulties and disadvantages of the two most well known types.

The invention is more particularly described with reference to the accompanying drawings in which:—

Figure 3 is an enlarged sectional view longitudinally through the drum shewing the construction of a shallow filter compartment.

Figure 4 is a corresponding enlarged plan view.

Figure 5 is a detail shewing the inlets to divisional strips forming the bounding walls of the compartment.

Figure 6 is a perspective view shewing the outlets from the divisional strips to the compartments.

Figure 1:
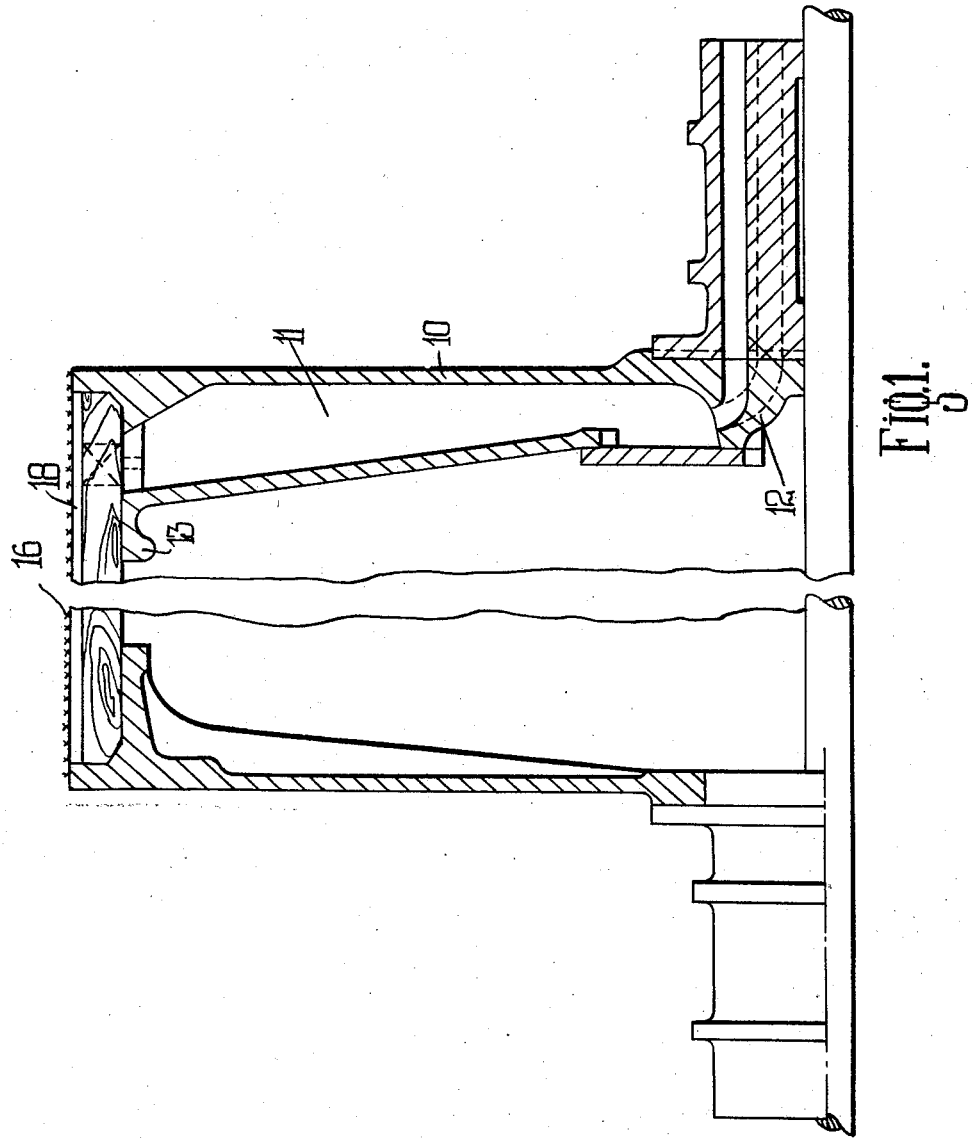
Figure 1 is a sectional view through one half of a drum shaped rotary filter constructed according to the present invention.
Figure 2:
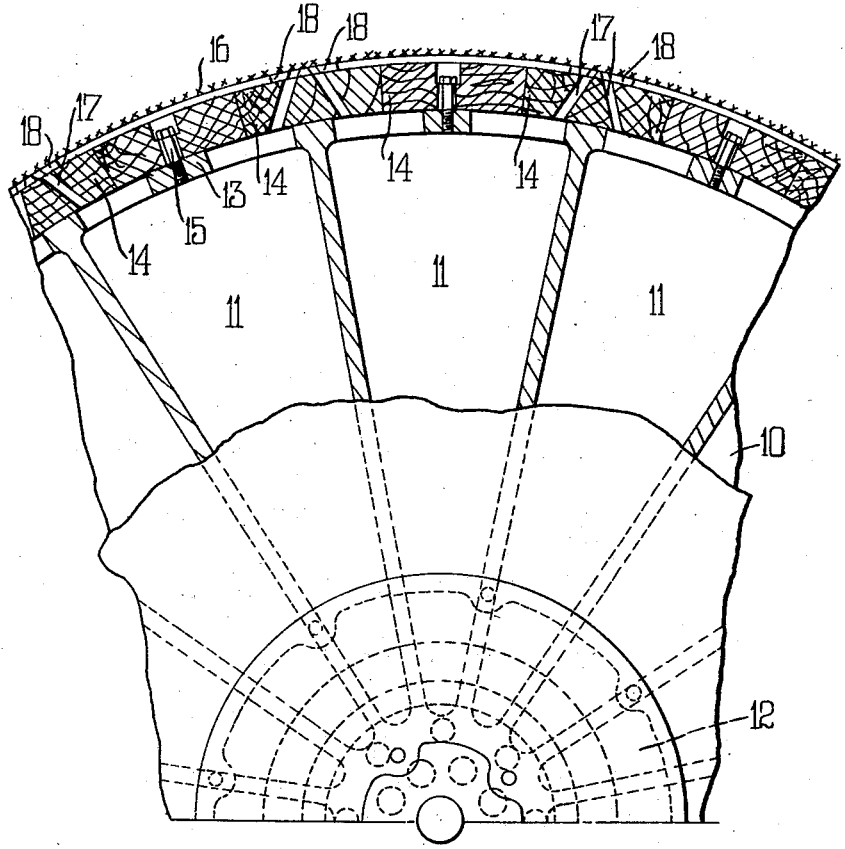
Figure 2 is a partial end elevation in section of the right hand end of the drum according to Figure 1.

In the construction according to the present invention the members carrying the filtering medium are shallow, whilst the multiple filter compartments are constructed by subdividing the drum by means of longitudinally disposed divisional strips to which means are provided for attaching the filter cloth in order to make an effective departmental seal for each of the multiple filter compartments. The divisional strips also act as suction inlets in a direction sideways thereof to evenly spread the suction.

For this purpose the divisional strips are formed of channel members arranged in pairs, each pair of channel members forming two separate mains one to each compartment. These mains communicate with conduits formed in a drum end plate, said conduits diverging from a central cellular facing to a ring facing on to which each divisional strip is secured for example by bolts.

By such an arrangement a minimum amount of labour is involved in assembling the filter, as the suction inlet conduits are self contained and constructed as a casting all in one piece and usually all in one only of the drum end plates, depending upon the practical requirements which may have to be fulfilled.

A trunnion shaft, having communicating cells therein leading to an automatic vacuum and pressure distributing valve, is connected to the central cellular facing of the drum end plate.

The divisional strips are of inverted channel section held rigidly on to the shell of the drum and have openings in the channel walls whereby connection is established between the suction conduits in the drum end plate, along the channels and into the compartments bounded by the channelled strips.

If desired however the vacuum may be supplied not by the inverted channel section of the divisional strips but by means of circumferential lateral sealing strips or further if desired the vacuum may be obtained by both.

Referring in detail to the drawings as illustrating preferred embodiments of the invention, a drum end plate 10 is formed with conduits 11 converging to a central cellular facing 12 and diverging to a machined ring facing 13 which supports the drum forming members 14 fixed thereto by bolts or screws 15.

The members 14, which also serve to carry the filtering medium in the form of a filter cloth 16, have openings 17 leading into the conduits 11.

The divisional strips are formed of shallow bars 18 of inverted channel section and fitted in pairs, such bars 18 subdividing the drum construction and forming the bounding walls of the multiple shallow filter compartments.

These bars 18 function as suction inlets and in a direction sideways, as is necessary to evenly distribute the vacuum, by means of openings 19 in the form of narrow slots in their outer webs and on the lower edge thereof at that part where they contact with the members 14. The contact surface of the inner and outer web of each bar 18 is accurately sealed by means of screws 20 which hold down the bars 18 on the members 14.

In order to provide an effective seal for each of the multiple filter compartments, the filter cloth 16 is held down in position on the channel bars 18, forming the divisional strips, by means of a length 21 of resilient material which is mounted in position between the inner webs 22 of the channel bars 18 of each pair. For this purpose the inner webs 22 of the channel bars 18 are inclined inwardly or towards the outer webs so that a cavity of triangular section is formed between the bars 18 of each pair. In this way the filter cloth 16 is clinched and securely held down in its required position.

The channel bars 18 forming the shallow passages for the required suction inlets have their ends sealed by flanges 23 as provided by the drum end plates.

I declare that what I claim is:—

1. A filter apparatus comprising a drum shell having passages therethrough, radial ends for supporting said drum shell, at least one of which ends has a plurality of radial conduits formed therein, a filter cloth covering for said drum shell and a plurality of inverted channel shaped members arranged in pairs between said covering and said shell for dividing the space between said covering and said shell into separate filter compartments, the hollow passages formed by said inverted channel members communicating with said filter compartments and also with the radially disposed conduits in said drum end.

2. A filter apparatus comprising a spaced pair of drum ends, at least one of which has radial conduits formed therein, a cylindrical shell on said drum having passages therethrough communicating with said radial conduits, longitudinally disposed inverted channel members arranged in pairs and supported externally on said shell and slotted at a number of points along their length at their lower edges and a filter cloth supported on said hollow channel members to form with said channel members and said shell a plurality of separate filter compartments.

3. A filter apparatus comprising a drum shell having passages therethrough, hollow radial supports for said drum shell, a filter covering for said drum shell, inverted channel members arranged in pairs between said covering and said shell for dividing the space between said covering and said shell into separate filter compartments, the passages of said inverted channel members communicating with those of said drum shell and with the radial conduits formed in said hollow radial supports, and sealing means for holding down said filter cloth covering on said inverted channel members to effectively render each filter compartment independent of adjacent compartments.

In witness whereof, I have hereunto signed my name this 30th day of January, 1930.

E. W. WOLFE KEENE.